United States Patent [19]

Bosik

[11] 4,196,321

[45] Apr. 1, 1980

[54] LOOPBACK TEST SYSTEM

[75] Inventor: Barry S. Bosik, Parsippany, N.J.

[73] Assignee: Bell Telephone Laboratories, Incorporated, Murray Hill, N.J.

[21] Appl. No.: 974,384

[22] Filed: Dec. 29, 1978

[51] Int. Cl.² .......................... H04B 3/46; H04J 3/14
[52] U.S. Cl. .............................. 179/175.2 R; 370/15
[58] Field of Search ................. 179/175.2 R, 175.2 B, 179/175.2 C, 175.2 D, 175.21, 175.24, 15 FD, 15 AL, 15 BF, 2.5 R, 84 VF, 175.3 R, 175.31 R; 325/2, 3

[56] References Cited

U.S. PATENT DOCUMENTS

| | | | |
|---|---|---|---|
| 3,410,966 | 11/1968 | Davies | 179/175.2 R |
| 4,002,847 | 1/1977 | Dail | 179/15 AL |
| 4,076,971 | 2/1978 | Mukaemachi et al. | 179/175.3 R |
| 4,101,743 | 7/1978 | Costes et al. | 179/175.2 R |

*Primary Examiner*—Thomas A. Robinson
*Attorney, Agent, or Firm*—Robert O. Nimtz

[57] ABSTRACT

A subscriber loop carrier system is disclosed for frequency multiplexing a plurality of subscriber channels on a single twisted metallic pair using frequency division techniques. Supervisory signaling is accomplished from the central office to a remote location by imposing a signaling tone of the carrier frequency for each signal. Supervision from the remote terminal to the central office is accomplished by interrupting the carrier signal itself. Ringing signals are supplied by interrupting the tone signal at a 20 Hz rate. Testing the subscriber channel is accomplished by leaving the tone on for a period in excess of the period used for ringing. Each channel of the carrier system can, therefore, be independently tested by using the uninterrupted tone to gate the remote carrier on for transmission back to the central office terminal. When detected, this carrier signal from the remote terminal indicates a complete communication path from the central office to the remote terminal and back again, i.e., channel continuity.

13 Claims, 11 Drawing Figures

SUBSCRIBER LOOP CARRIER SYSTEM

C.O. MODEM

R.T MODEM

CENTRAL OFFICE CONTROL CIRCUITS

CENTRAL OFFICE LOOP CLOSURE DETECTOR

RT. CONTROL CIRCUITS

CENTRAL OFFICE RINGING AND LOOPBACK TEST CONTROL CIRCUITS

REMOTE TERMINAL CONTROL CIRCUITS

REMOTE TERMINAL CONTROL CIRCUITS

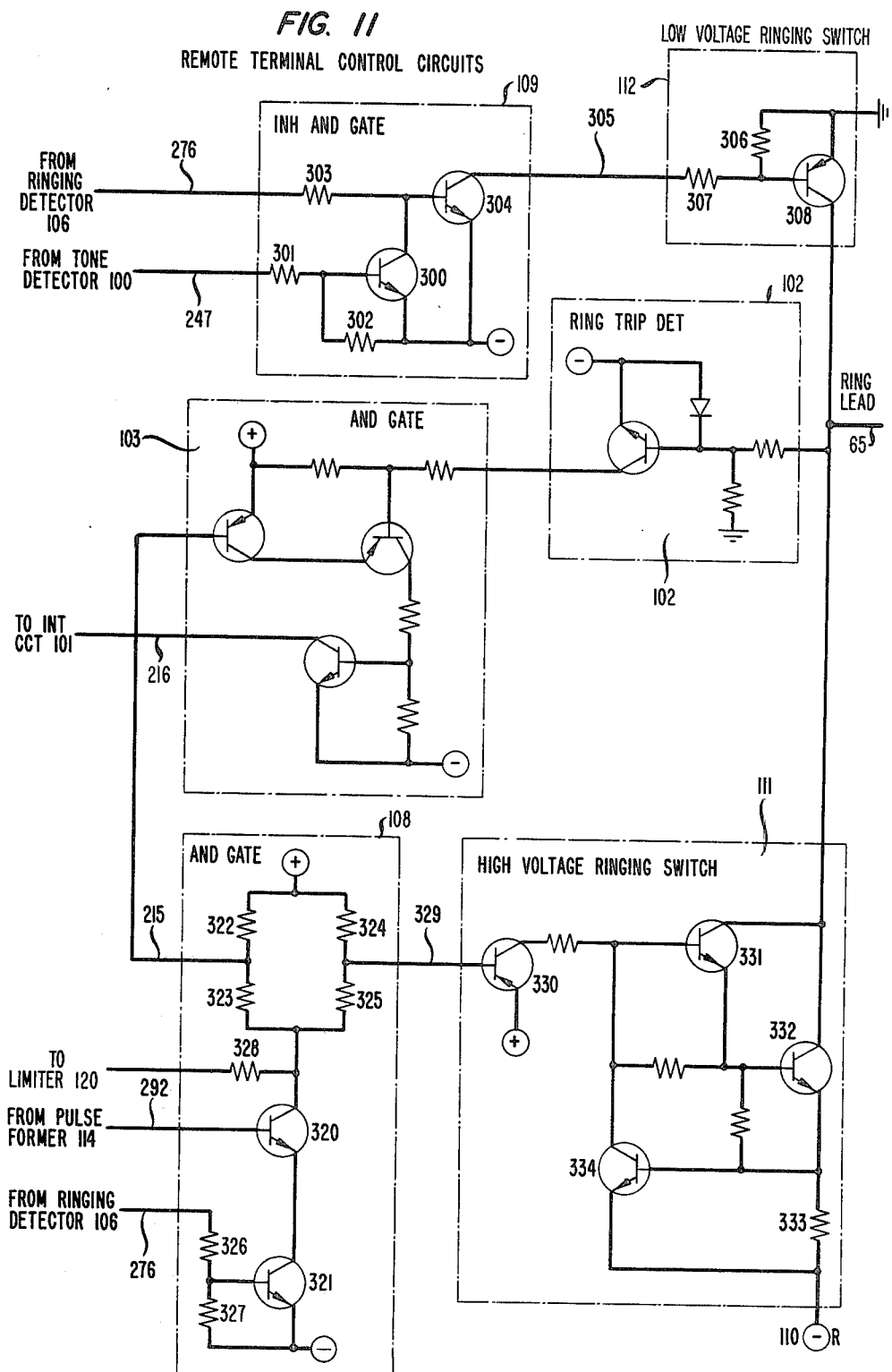
FIG. 11 REMOTE TERMINAL CONTROL CIRCUITS

LOOPBACK TEST SYSTEM

BACKGROUND OF THE INVENTION

1. Field of the Invention

This invention relates to telephone subscriber loop carrier systems and, more particularly, to the testing of the various channels in such a system to establish continuity of the communication path.

2. Description of the Prior Art

It has become increasingly common to apply carrier techniques to subscriber loops in order to avoid or postpone the placement of telephone cable in situations where cable placement represents a substantial capital investment. Obvious situations of this type are for rural subscribers where loops are excessively long or for congested urban areas where cables laying is excessively expensive. Two such systems are disclosed in J. L. Caldwell U.S. Pat. No. 3,963,869, issued June 15, 1976 and T. N. Rao et al U.S. Pat. No. 4,028,628, issued June 7, 1977.

In such subscriber loop carrier systems, a metallic path from the central office no longer exists for each subscriber. Normal testing of the subscriber facility cannot be accomplished by the prior art technique of establishing the direct current continuity of the loop. Such testing, however, has become a standard part of the preventive maintenance as well as the troubleshooting procedures for telephone subscriber loops.

Conventional telephone supervisory signaling, likewise depending upon direct current signaling over a metallic subscriber loop, similarly cannot be accomplished in the conventional manner over the frequency-derived subscriber communication channel. Thus, off-hook supervision, dial pulsing, ring trip detection and ringing itself must be accomplished utilizing carrier techniques. Prior art systems, such as that disclosed in the above-noted Rao et al patent, accomplish ringing by interrupting the carrier signal from the central office at a ringing signal rate. In carrier systems operating over repeatered transmission facilities, however, it is often necessary to maintain the carrier on at all times to control the repeater gain. It is therefore not possible to transmit ringing information by interrupting the carrier.

SUMMARY OF THE INVENTION

In accordance with the illustrative embodiment of the present invention, both ringing signaling and continuity testing are accomplished over carrier-derived communications channels by superimposing a signaling tone on a continuous carrier. Ringing is signaled by interrupting the tone at the ringing frequency rate (e.g., 20 Hz). Continuity testing is accomplished by superimposing continuous tone which, at the remote terminal, is detected and the return carrier is transmitted from the remote terminal back to the central office terminal. The returned carrier is detected at the central office location and thereby confirms continuity of the talking path. This is therefore called a loopback continuity test.

A particular advantage of this arrangement for continuity testing is that the continuity test can be initiated in response to standard direct current voltages used for normal testing of metallic subscriber loops. The successful completion of the continuity test, in accordance with the present invention, can likewise be reported to the central office testing facility by generating a standard voltage condition at the central office appearance of the carrier-derived subscriber loop.

BRIEF DESCRIPTION OF THE DRAWINGS

In the drawings:

FIGS. 8, 9, 10 and 11, taken together, comprise a detailed circuit diagram of the remote terminal control circuits of FIG. 5.

DETAILED DESCRIPTION

Figure 1:
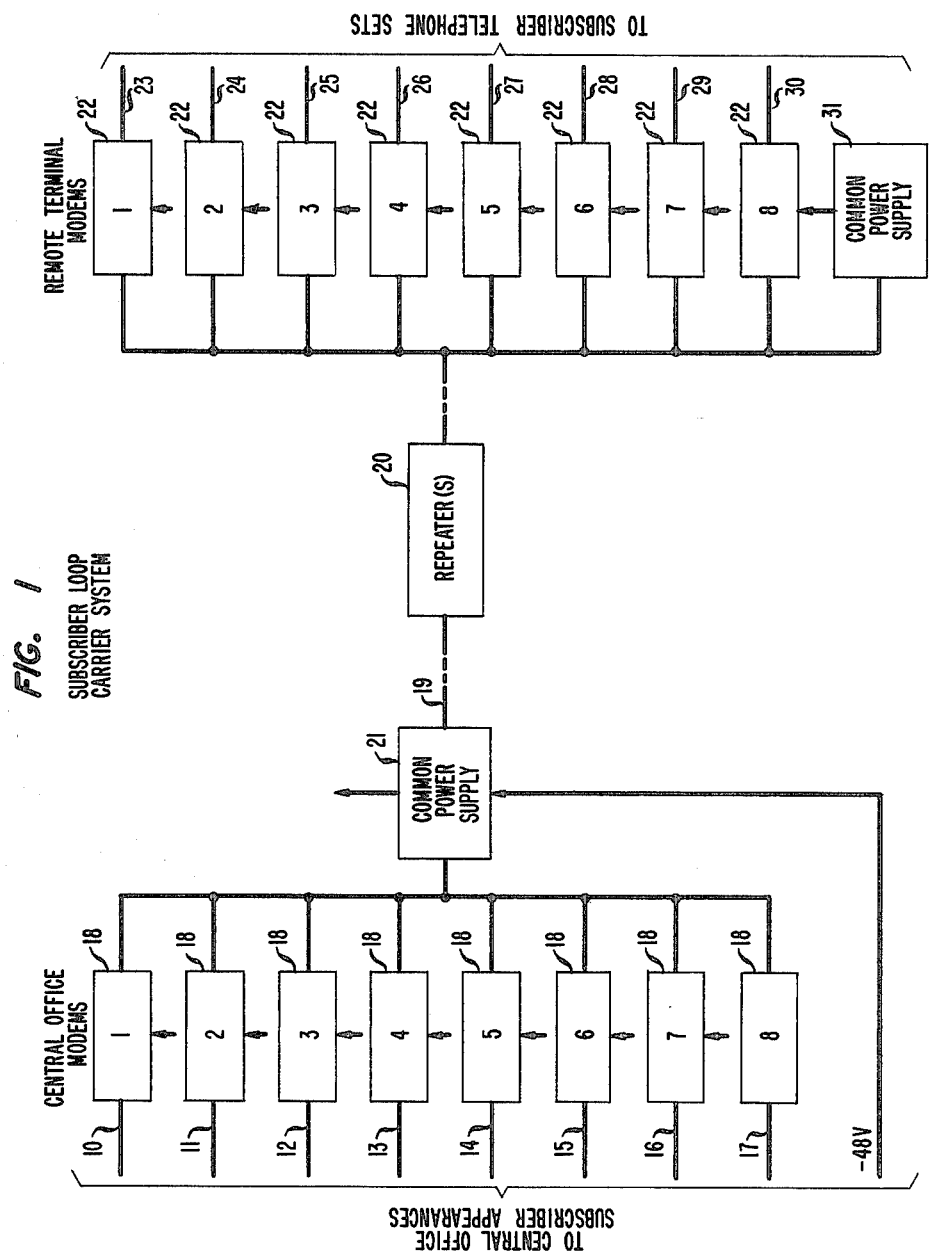
FIG. 1 is a general block diagram of a subscriber loop carrier system in which the supervision and testing arrangements of the present invention may find use.

Referring more particularly to FIG. 1, there is shown a general block diagram of a subscriber loop carrier system with which the ringing and continuity testing arrangements of the present invention might find use. In FIG. 1 a plurality of subscriber loop appearances 10 through 17 are each connected to a respective one of central office modems 18, the outputs of which are connected through a common power supply 21 to a common transmission facility 19. All of modems 18 are identical in circuit structure, but each operates at a different carrier frequency. The carrier frequencies for the direction of transmission from the central office to the remote terminal form a first group of frequencies while the carrier frequencies received from the remote terminal by each of modems 18 form a second group of carrier frequencies. These carrier frequencies are thereby separated into low and high bands for ease of processing in a plurality of repeaters 20 spaced along transmission facility 19. Common power supply 21, operated from the central office battery, supplies potentials for powering the repeated line and the remote terminal and interfaces the modems with the carrier line.

At the remote end of the transmission facility 19, this transmission facility is connected to a plurality of remote terminal modems 22, each identical to the others in circuitry but each operating at different transmitting and receiving frequencies. Modems 22 are connected to subscriber station drop loops 23 through 30, themselves connected to individual subscriber telephone station sets. A common power supply 31 is operated either from the central office battery, supplied over transmission facility 19, or from a locally derived power source and is used to provide operating voltages for the electronic circuitry in modems 22.

The subscriber loop carrier system of FIG. 1 has been shown with eight frequency-derived channels for the purpose of illustration only. A fewer or greater number of channels can be accommodated simply by adding a subtracting modems 18 and 22 and assigning carrier frequencies to accommodate the number of channels actually used.

Similarly, the remote terminal modems have been illustrated as being "lumped" in one location for illustrative purposes only. Alternatively, each modem can be located in a different location convenient to the subscriber it serves, and each modem provided with a separate power supply.

The provision of more than one subscriber channel over transmission facility 19 makes very efficient use of the transmission facility but prevents the use of direct current signaling on the common transmission facility 19 for all of the subscriber channels. It is therefore necessary to accommodate such signaling in the carrier-derived channels themselves and it is to this end that the present invention is directed.

Figure 2:
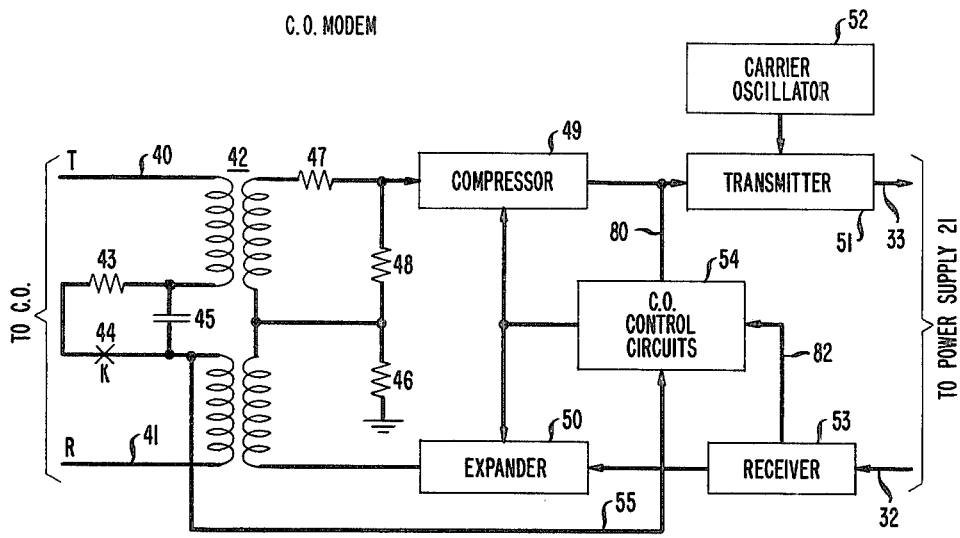
FIG. 2 is a block diagram of a central office modem useful in the realization of the carrier system of FIG. 1.

Referring then to FIG. 2, there is shown a more detailed block diagram of the central office modem 18 of FIG. 1. The central office modem is connected to the central office by means of tip conductor 40 and ring conductor 41 and comprises a hybrid transformer 42 to which conductors 40 and 41 are connected. A resistor 43 and normally-open relay contacts 44 are connected in series with the primary winding of transformer 42. A capacitor 45 is connected in shunt with resistor 43 and contacts 44 to provide an alternating current bypass across resistor 43 for audio transmission. The secondary side of hybrid transformer 42 has a resistor 46 connected from its center tap to ground as a balancing impedance.

Audio voltages from tip conductor 40 and ring conductor 41 are developed across the voltage divider comprising resistors 47 and 48 and are applied to a compressor circuit 49. Compressor 49 compresses the amplitude range of the audio signals supplied to its input so as to increase the signal-to-noise ratio in the frequency-derived carrier channels. The compressor 49, as well as the complementary expander 50, may be of the form shown in R. Toumani U.S. Pat. No. 3,919,654, issued Nov. 11, 1975. The output of compressor 49 is applied to a transmitter 51 to which a carrier signal from oscillator 52 is also applied. The audio signals from compressor 49 are amplitude modulated on the carrier frequency from oscillator 52 and launched on transmission facility 19 via lead 33 and the power supply 21 as shown in FIG. 1.

Audio modulated carrier signals from the remote terminal arrive on transmission facility 19 and are supplied through the power supply 21 over lead 32 to a receiver 53 which detects the audio signals and supplies the audio signals to expander 50. Expander 50 restores the full amplitude range of the audio signal and supplies the expanded signal to hybrid transformer 42. These voice signals are then sent through conductors 40 and 41 to the central office facilities.

Central office control circuits 54 provide several control functions for the central office modem of FIG. 2. Control circuits 54, for example, monitor the signal on the central office side of hybrid transformer 42 by way of lead 55 to detect 20 Hz ringing signals as well as to detect a test voltage applied to these conductors, e.g., a large positive voltage, exceeding the normal central office battery supply. This high voltage is normally supplied to metallic subscriber loops in order to perform a leakage test of the loop. Control circuits 54 respond to these central office signals by impressing a supervisory tone of a preselected frequency on the carrier signal in transmitter 51 via lead 80. In accordance with one aspect of the illustrative embodiment of the present invention, ringing signals are relayed to the remote terminal by interrupting the supervisory tone at a ringing signal rate. The test voltage, on the other hand, is relayed to the remote terminal by turning the supervisory tone on and leaving it on for a period exceeding the 50-milliseconds ringing period.

Control circuits 54 are also connected to receiver 53 via lead 82 to detect the presence of the carrier signal from the remote terminal of the system. In the presence of such a carrier signal, a relay is operated to close relay contacts 44 and provide line closure information to the central office. At the same time, control circuits 54 provide operating voltage to compressor 49 and expander 50 to enable these units to respond to voice signals in the channel. Control circuits 54 will be more fully described in connection with FIG. 4.

Figure 3:
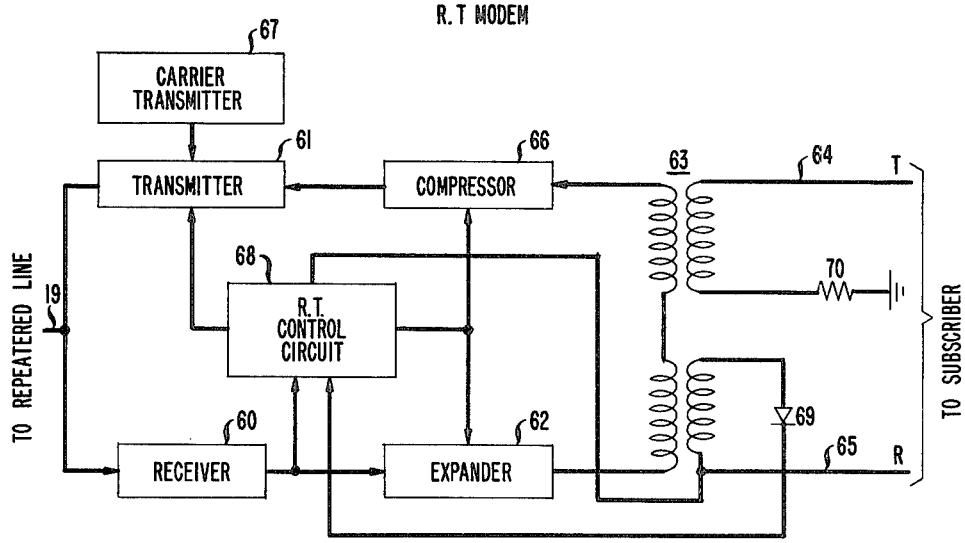
FIG. 3 is a block diagram of a remote terminal modem which may likewise find use in the carrier system of FIG. 1.

In FIG. 3 there is shown a more detailed block diagram of the remote terminal modems 22 (FIG. 1) which are connected to transmission facility 19 at a location remote from the central office. Transmission facility 19 is connected to a receiver 60 and a transmitter 61. Receiver 60 responds to signals from transmitter 51 in FIG. 2, detecting the audio signal modulated on the assigned carrier frequency and supplying these audio signals to expander circuit 62. Expander 62 may be identical to expander 50 in FIG. 2 and restores the full amplitude range of the compressed audio signals supplied to hybrid transformer 63. These audio signals can then be supplied by tip conductor 64 and ring conductor 65 to the local telephone subscriber station set.

Audio signals from the subscriber are supplied by way of hybrid transformer 63 to compressor circuit 66 which may be identical to compressor 49 in FIG. 2. Again, compressor 66 compresses the amplitude range of the applied audio signals and supplies this compressed audio signal to transmitter 61. Transmitter 61 modulates the compressed audio signals onto a carrier supplied by carrier oscillator 67 and launches the modulated signal on common transmission facility 19.

Remote terminal control circuit 68 provides the necessary supervisory functions at the remote terminal. First, in response to the supervisory tone modulated on the received carrier and detected by receiver 60, control circuit 68 discriminates between ringing signals (tone interrupted at a 20 Hz rate) and a test signal (a supervisory tone continuously on). In response to ringing signals, control circuit 68 supplies a locally generated ringing signal to the ring conductor 65 of the local subscriber drop. In response to the test signal, control circuit 68 enables transmitter 61 to transmit the carrier signal back to the central office location. This carrier signal can then be detected to indicate the complete continuity of the derived subscriber channel provided by the associated modems and the repeatered line.

Control circuit 68 also includes a line feed circuit for supplying talking current to the local subscriber loop. That is, a current is supplied through diode 69, ring conductor 65, the telephone set, tip conductor 64 and balancing impedance 70 to ground. Control circuit 68 also provides switchhook detection by monitoring the current in the local subscriber drop and detecting the presence of a direct current when the subscriber goes off-hook. Control circuit 68 also provides ring trip detection by recognizing the drop in ringing voltage that occurs on ring conductor 65 when the telephone set goes off-hook during ringing. This ring trip signal is used to interrupt the locally generated ringing signals. Both the switchhook detection signal and the ring trip detection signal are also used to enable transmitter 61 to transmit a carrier signal back to the central office terminal. This carrier signal indicates that the subscriber has gone off-hook. Control circuit 68, by means of its switchhook detector, is also responsive to dial pulses and likewise enables the transmission of a carrier signal in synchronism with the dial pulses. As noted in connection with FIG. 2, carrier signals received at the central office modem results in the closure of relay contacts to complete a direct current path between the tip and ring conductors of the central office appearance. This relay then operates in synchronism with the switchhook or the dial pulses of the telephone set. Remote terminal control circuit 68 is more fully described in connection with FIG. 5.

Figure 4:
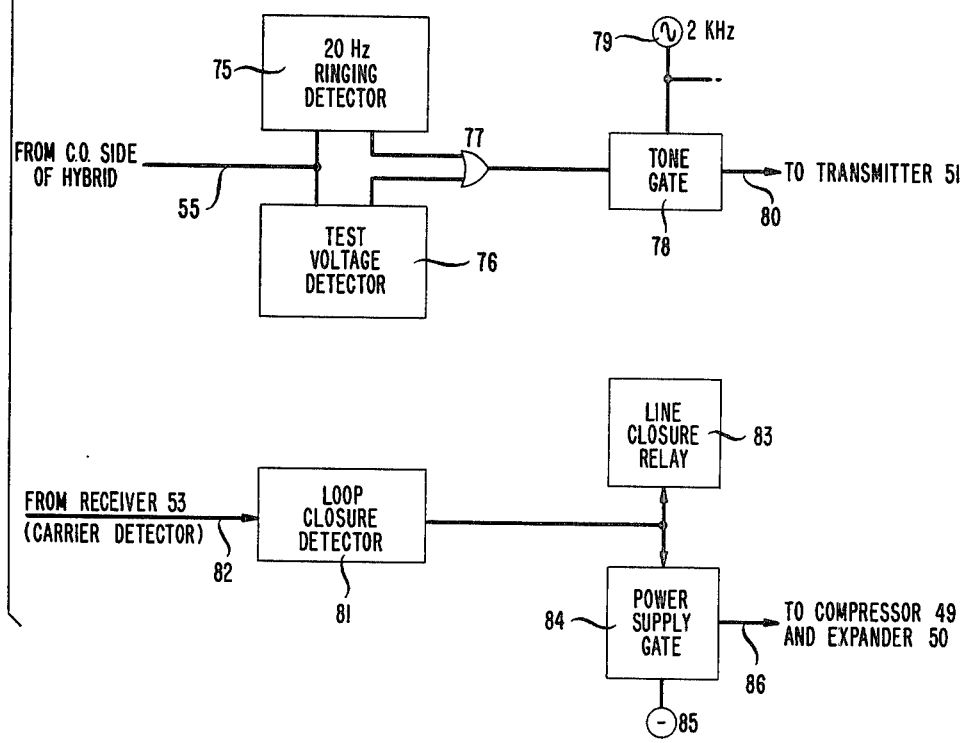
FIG. 4 is a more detailed block diagram of the central office common control circuits of the central office modem shown in FIG. 2.

Referring to FIG. 4, there is shown a detailed block diagram of the central office control circuits shown in block 54 in FIG. 2. The control circuit of FIG. 4 comprises a ringing signal detector 75 and a heat voltage detector 76 both of which are connected by way of lead 55 to the central office side of the hybrid transformer 42. The outputs of detectors 75 and 76 are supplied to the inputs of OR gate 77 which, when enabled, operates tone gate 78. Tone gate 78, when thus enabled, connects a tone source 79 to lead 80 connected to transmitter 51 in FIG. 2. As previously mentioned, this tone is used to modulate the carrier frequency in the transmitter and thereby transmit the supervisory tone to the remote terminal location. It will be noted that tone source 79 (2 kHz in the illustrative embodiment) can be used to supply supervisory signaling for all of the other central office modems 18 shown in FIG. 1. The tone from source 79 is, of course, modulated on different carrier frequencies in the various central office modems.

The central office control circuits of FIG. 4 also include a loop closure detector 81 which responds to detected carrier signals on lead 82 from receiver 53 in FIG. 2 to detect the presence or absence of a received carrier signal. As previously noted, this carrier signal is used for supervisory signaling from the remote terminal. The output of detector 81 is applied to line closure relay 83 which, in turn, operates normally open contacts 44 (FIG. 2) to provide the line closure information to the central office. It should be noted that this line closure can be continuous (indicating an off-hook condition) or it can be discontinuous (indicating dial pulsing). It should also be noted that multifrequency signaling tones from the remote subscribers are transmitted directly over the carrier frequency channel, demodulated and transmitted to the central office by way of hybrid transformer 42.

The output of loop closure detector 81 is also supplied to a power supply gate 84 which connects a negative power supply 85 to lead 86 in order to provide operating voltages to compressor 49 and expander 50 in FIG. 2. It can thus be seen that transmitter 51 and receiver 53 in FIG. 2 are continuously powered to permit supervisory signaling to the remote terminal and automatic gain control in the intervening repeaters. Compressor 49 and expander 50, however, are powered only when the subscriber channel is actively in use for voice transmission.

Figure 5:
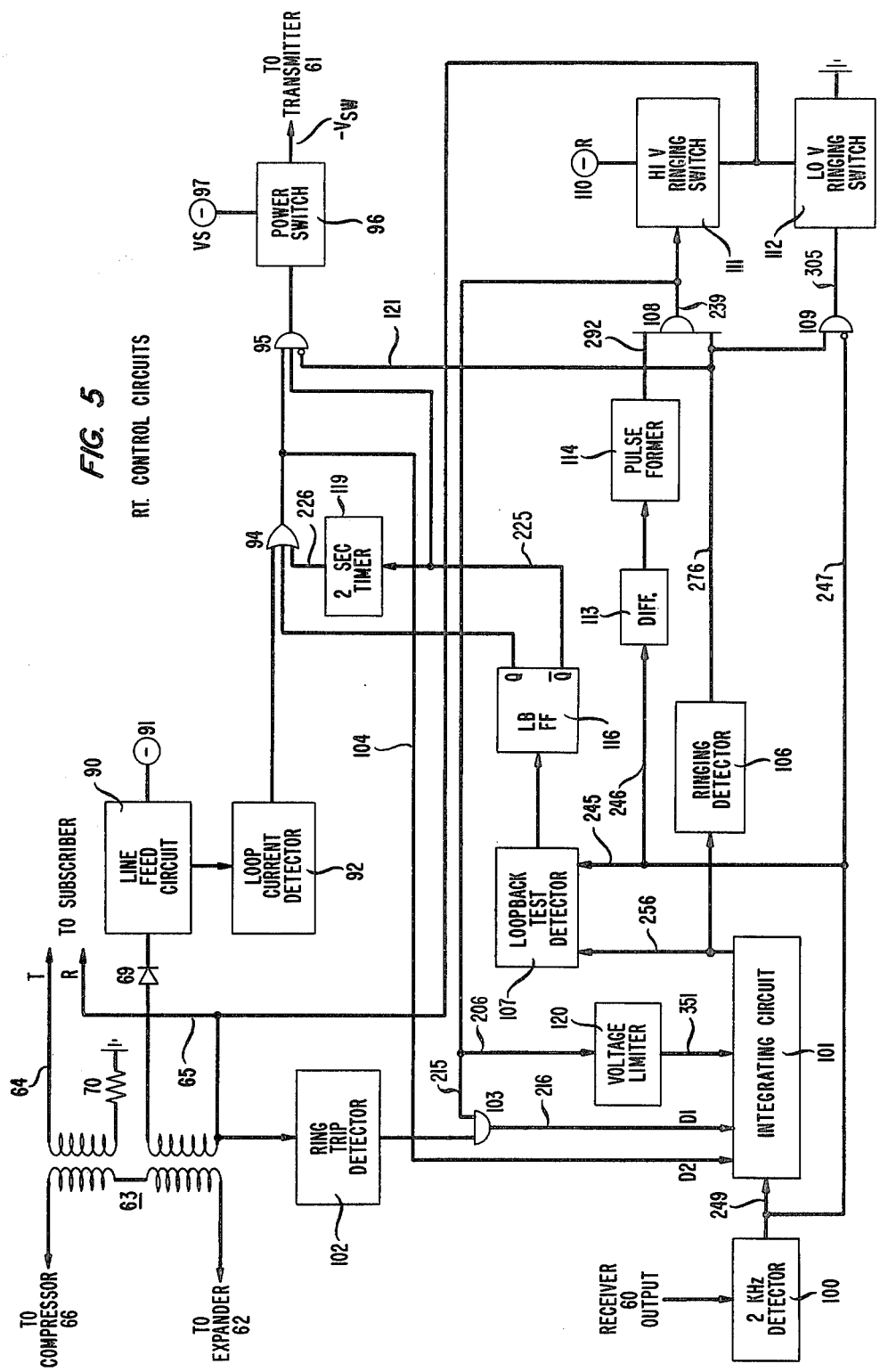
FIG. 5 is a more detailed block diagram of the remote terminal control circuits of the remote terminal modem of FIG. 3.

In FIG. 5 there is shown a detailed block diagram of remote terminal control circuits 68 of FIG. 3. For convenience, hybrid transformer 63 has also been shown in FIG. 5 together with diode 69 and ring conductor 65. Line feed circuit 90 provides a constant talking current (when the telephone set is off-hook) to ring conductor 65 through diode 69 from negative voltage source 91. This talking current is monitored by loop current detector 92 and, then loop current is detected, detector 92 enables a power switch 96 by way of OR gate 94 and AND gate 95. When operated, power switch 96 supplies operating voltage from source 97 to transmitter 61 to enable the transmission of carrier signals to the central office terminal. As previously discussed, this carrier signal indicates a line closure at the remote subscriber location.

The output of receiver 60 in FIG. 3 is supplied to a 2 kHz tone detector 100 in FIG. 5 which detects the envelope of the 2 kHz tone signal modulated on the received carrier frequency. This envelope, indicating ringing when interrupted at a 20 Hz rate, and indicating a test condition when continuous, is supplied to integrating circuit 101. Integrating circuit 101 is utilized to delay recognition of ringing, ring trip, loop current detection, and the loopback test in order to insure that they are not implemented in response to spurious transient signals.

When the envelope of the 2 kHz signaling tone, as provided by 2 kHz detector 100, is high, the output of circuit 101 slowly rises. For a fifty percent duty cycle envelope, the output of circuit 101 rises to a level higher than the threshold of ringing detector 106 but lower than the threshold of loopback test detector 107. Hence, when ringing is being signaled, the ringing detector 106 is activated after a relay due to the integrating action of circuit 101. For a continuous output of the 2 kHz detector 100, the threshold of the loopback test detector 107 is exceeded and both the loopback test detector and the ringing detector 106 are activated. Voltage limiter circuit 120 prevents the output of integrating circuit 101 from reaching the loopback test detector threshold during ringing. Hence, the loopback test cannot be falsely triggered during ringing due to irregularities in the 20 Hz duty cycle.

Input signals at inputs $D_1$ and $D_2$ to integrating circuit 101 cause the output to decay. An input signal at $D_1$ will cause a relatively rapid decay of the output while an input at $D_2$ will cause a slower decay. The fast decay is implemented in response to a ring trip signal provided by ring trip detector 102 and AND gate 103 when a ring trip condition is sensed and at a time when the high voltage ringing switch 111 is activated. The slower decay is implemented in response to a loop current detection or a loopback test detection as indicated at the output of OR gate 94 over lead 104.

The ringing detector 106 is a comparator with hysteresis. That is, when activated by a voltage exceeding its threshold voltage, the threshold at which detector 106 will turn off drops well below the turn-on threshold. Hence its input must decay significantly before the ringing detector 106 turns off. This is the mechanism by which the ring trip delay and the loop current detection during ringing delay are implemented.

The output of the ringing detector 106, in conjunction with the fifty percent duty cycle envelope appearing at the output of the 2 kHz detector 100, form, through AND gate 109, the excitation for the low voltage ringing switch 112. Circuit 112 provides the low voltage interval for the ringing voltage appearing at the ring lead 65. The high voltage interval of ringing voltage is provided by switch 111 switching to the ring voltage 110 in response to the output of AND gate 108. The 2 kHz envelope from circuit 100 is differentiated by circuit 113. Positive transitions at the input of differentiating circuit 113 cause positive pulses at the input to pulse former 114 to which the pulse former responds. The output of the pulse former 114, in conjunction with the output of the ringing detector 106, forms the inputs to the AND gate 108. In this manner, the high voltage half-cycle of ringing is excited only on positive transitions of the 2 kHz envelope which appear after the ringing detector 106 turn-on delay. Hence, the high ringing voltage cannot be turned on during the continuous 2 kHz signal appearing during the loopback test.

Ringing signals, then, are supplied to the local subscriber loop on lead 65 by gating a high negative voltage source 110 through high voltage ringing switch 111 at a 20 Hz rate. A low voltage ringing switch 112 provides a ground return path for the opposite half-cycles of ringing current and thus connects ring conductor 65 to ground potential during the time that ringing switch 111 is off. The rise and fall times of the ringing voltage are controlled such that the audio components of the ringing signal on the subscriber loop have sufficiently small frequency components in the audio range that crosstalk on the pairs in the same cable is minimized.

Loopback test detector 107 turns on in the presence of a continuous supervisory tone, indicating the requirement for conducting a continuity test. Loopback test detector 107 responds to the high voltage level appearing at the output of integrating circuit 101 in the presence of uninterrupted supervisory tone to set a loopback flip-flop 116. Flip-flop 116 is reset following the termination of the continuous loopback tone signal from detector 100. When in the set condition, flip-flop 116 enables OR gate 94. OR gate 94, in turn, partially enables AND gate 95. AND gate 95, however, is not fully enabled since the inverted output of flip-flop 116 is supplied to the other input of AND gate 95. Power switch 96 is therefore not enabled at this time. However, OR gate 94 being enabled raises the $D_2$ input to integrating circuit 101 to a high level via lead 104. This causes the output of circuit 101 to decay below the turn-off threshold of ringing detector 106. Hence, the ringing detector turns off, preventing ringing from occurring during a loopback test.

The inverted output of flip-flop 116 is also supplied to a two-second timer circuit 119 over lead 225. When the continuous 2 kHz tone disappears during the performance of the loopback test, the output of the envelope detector 100 goes low, causing the loopback flip-flop 116 to reset. The inverting output of flip-flop 116 is thus switched high, activating the two-second timer 119. The power switch 96 is then activated via OR gate 94 and AND gate 95 for the two-second interval. When activated, power switch 96 connects operating voltage to the transmitter 61 in FIG. 3. Transmitter 61 therefore transmits a carrier signal to the central office terminals which is detected there and used to operate the loop closure relay contacts 44. In this way, a successful completion of the continuity test is indicated at the central office location by a loop closure for two seconds following the continuity test request. This test request is indicated by the sequence of a high voltage applied to and then removed from the central office appearance of that subscriber channel.

In accordance with standard testing procedures for metallic loops, a testing person at the local test desk in the central office can therefore apply a high test voltage (higher than the normal office battery voltage and of opposite polarity) to the subscriber appearance at the central office. Also in accordance with standard metallic loop testing procedures, the high voltage is removed and loop closure is monitored on the derived subscriber channel in order to detect the return of a loop closure signal to the central office appearance. This closure indicates the completion of a successful continuity test. Thus, from the point of view of the testing person at the local test desk, the testing of derived subscriber channels in a carrier system in accordance with the present invention uses procedures identical to the testing procedures for standard metallic loops. This makes it unnecessary to provide special testing procedures for the carrier-derived channels in the system of the present invention.

Figure 6:
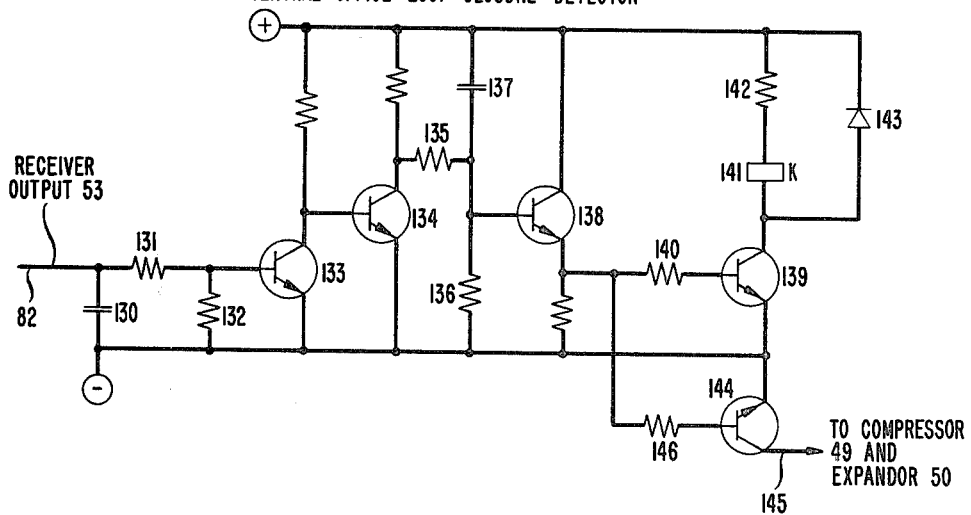
FIG. 6 is a detailed circuit diagram of the loop closure detector circuits of the central office control circuits shown in FIG. 4.

Referring more particularly to FIG. 6, there is shown a detailed circuit diagram of the loop closure detector portion of the central office control circuits shown in FIG. 4. The detection of a carrier signal in the received channel for that subscriber is indicated by a signal on lead 82. This carrier signal is envelope-detected by means of a filter comprising capacitor 130 and resistors 131 and 132. This carrier envelope is supplied to an amplifier comprising transistors 133 and 134. The output of transistor 134 is applied to a delay circuit comprising resistors 135 and 136 and capacitor 137. Transistor 138 therefore does not respond to the detected envelope until after a brief delay required to charge capacitor 137. This prevents the detector of FIG. 6 from inadvertently responding to short noise bursts on the transmission line.

When transistor 138 does operate, transistor 139 is enabled through resistor 140. Transistor 139 completes the operate path for K relay 141 through current limiting resistor 142. A diode 143 is connected across relay 141 and resistor 142 to prevent the voltage transient occurring when transistor 139 turns off from damaging the transistor.

The output of transistor 138 is also supplied through resistor 146 to the base of transistor 144 to enable transistor 144 to connect the negative voltage supply at its emitter to lead 145. Lead 145 supplies operating voltage to the compressor 49 and expander 50 of FIG. 2, thus fully enabling a talking path through the central office modem.

Figure 7:
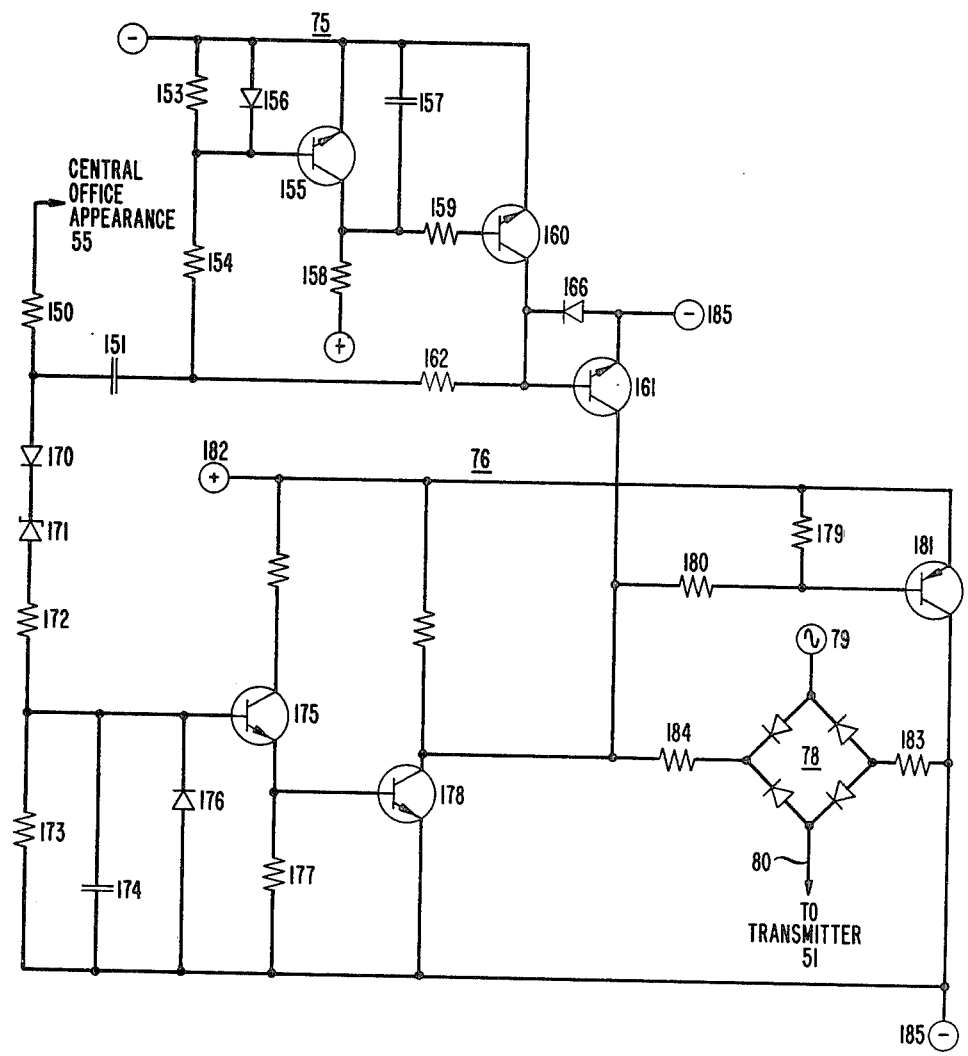
FIG. 7 is a detailed circuit diagram of the ring detector and continuity test detector circuits of the central office control circuits of FIG. 4.

In FIG. 7 there is shown a detailed circuit diagram of the ringing and loopback test control circuits shown in block form in FIG. 4. Thus lead 55 from the central office side of hybrid transformer 42 is connected through resistor 150 and capacitor 151 to a 20 Hz ringing detector 75. This ringing signal is supplied across a voltage divider comprising resistors 153 and 154, the midpoint of which is connected to the base of transistor 155. Diode 156 shunts the negative half-cycles of the ringing signal to protect transistor 155 during the negative half-cycles. When operated, transistor 155 discharges capacitor 157 (previously charged through resistor 158). Thus, capacitor 157 is charged and discharged at the 2-second on, 4-second off ringing envelope rate. The voltage on capacitor 157 is supplied through resistor 159 to the base of transistor 160 to disable transistor 160 at this ringing envelope rate.

The ringing signal is also supplied through capacitor 151 and resistor 162 to the base of transistor 161. Again, the negative half-cycles of this ringing signal are shunted across the base emitter path of transistor 161 by way of diode 166. Transistor 161, when enabled by transistor 160 being off, therefore operates at the 20 Hz ringing rate and serves to enable the tone gate 78 at the ringing frequency rate, as will be described hereinafter.

Signals on lead 55 are also connected through resistor 150 to a voltage divider comprising diode 170, zener diode 171 and resistors 172 and 173. A test voltage on lead 55, of the proper polarity to pass diode 170 and of sufficient magnitude to break down zener diode 171, is impressed across resistors 172 and 173. This voltage charges capacitor 174 and, when capacitor 174 is sufficiently charged, operates transistor 175. Diode 176 protects the base-emitter path of transistor 175 against reverse voltage. The output of transistor 175, developed across resistor 177, is supplied to the base of transistor 178. Thus, when operated, the output of transistor 178 indicates the presence of a loopback test voltage at the central office appearance of sufficient duration to eliminate inadvertent noise spikes. The output of transistor 178 is also used to operate tone gate 78.

When either transistor 161 or transistor 178 is enabled, a voltage is developed across the voltage divider comprising resistors 179 and 180. The midpoint of these resistors is applied to the base of transistor 181 which connects a positive voltage source 182 through resistor 183, tone gate 78, resistor 184 and through the collector-emitter path of either transistor 161 or transistor 178 to negative potential source 185. Current flowing in this path forward biases all of the diodes of tone gate 78, thus turning tone gate 78 on and connecting tone source 79 to output lead 80 and thence to transmitter 51. As previously noted, this tone is thereby modulated onto the carrier for transmission to the remote terminal location.

Figure 8:
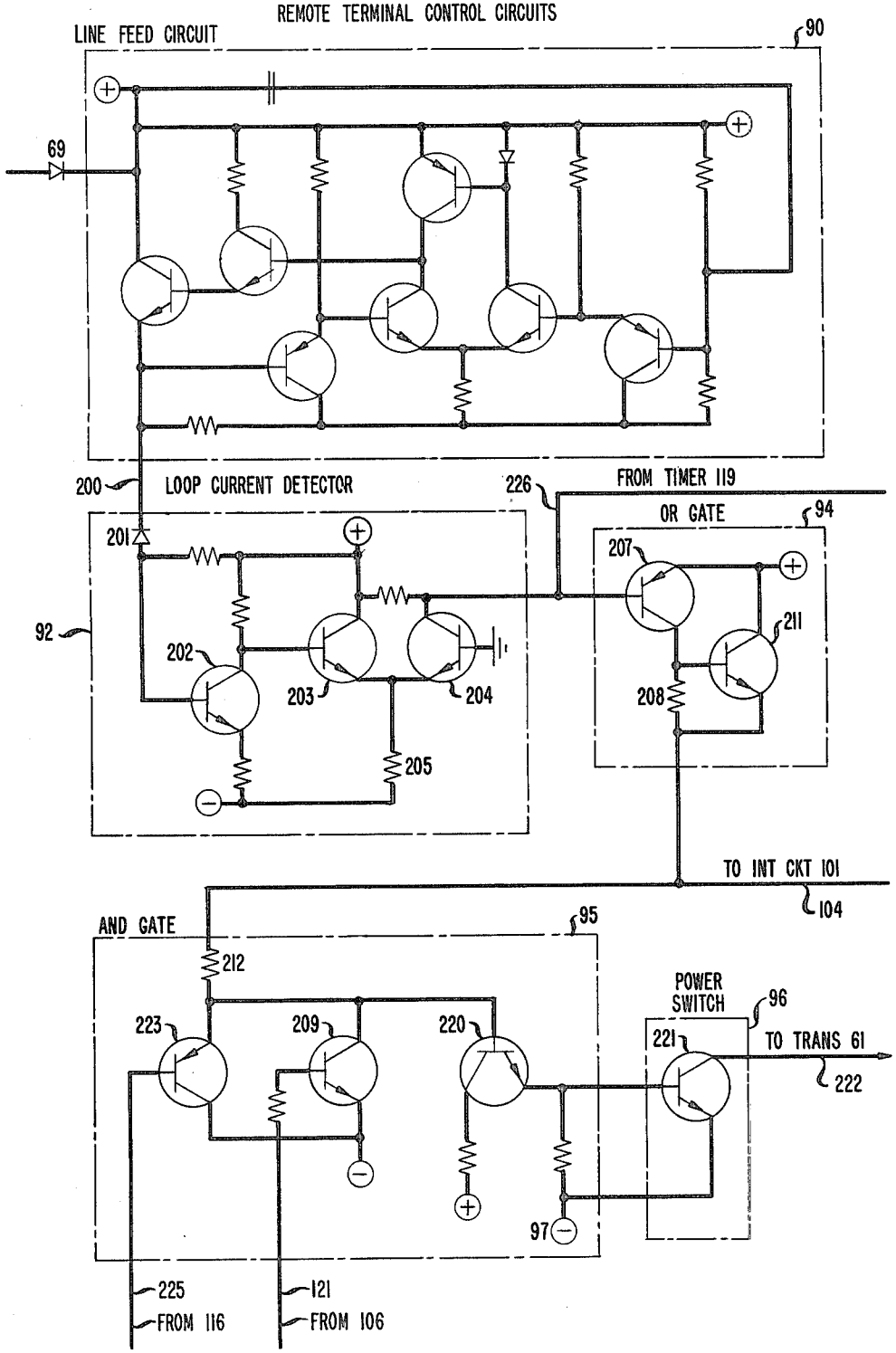

In FIG. 8 there is shown a detailed circuit diagram of a portion of the remote terminal control circuits shown as block 68 in FIG. 3 and in block diagram form in FIG. 5. The control circuits of FIG. 8 include a line feed circuit 90 which serves to provide a constant talking current to the local subscriber loop through diode 69. The line feed circuit 90 comprises the subject matter of a patent application of the present applicant, Ser. No. 974,386, filed of even data herewith, and will not be described in detail.

Line feed circuit 90 provides on lead 200 to loop current detector 92 a signal proportional to the current that is being supplied to the local subscriber drop. Lead 200 is connected through diode 201 to the base of transistor 202 and turns transistor 202 on in the presence of loop current. The collector of transistor 202 is connected to one input of a long-tailed pair comprising transistors 203 and 204 having their emitter electrodes connected together through a common emitter resistor 205. The other input to the long-tailed pair at the base of transistor 204 is connected to ground potential.

Transistor 202 remains in the OFF condition when the circuit is in its quiescent state. The presence of loop current raises the voltage on lead 200 which raises the anode and cathode voltages of diode 201. Hence, the base of transistor 202 rises with loop current. As it rises, a current is developed in its collector-emitter path which is proportional to the loop current. When the loop current reaches a threshold value, the collector voltage of transistor 202 reaches ground potential and switches the long-tailed pair. This produces the loop current detection indication at the output of the loop current detector.

The voltage at the collector of transistor 204 is applied to OR gate 94 and, in particular, to the base of transistor 207. When transistor 204 turns on in response to loop current detection, transistor 207 is activated. The voltage at the collector of transistor 207 operates transistor 211, providing a positive voltage through resistor 212 to AND gate 95 and then to power switch 96. When transistor 211 is operated, transistor 220 of AND gate 95 is operated unless the input from pulse former 116 to transistor 223 is low or the input from ring detector 106 is high. Thus AND gate 95 prevents the power switch from turning on while the loopback test is in progress or in response to spurious loop current detections during ringing.

The output of AND gate 95 is applied to power switch 96 comprising transistor 221. When operated, switch 96 connects negative voltage source 97 to output lead 222. As discussed in connection with FIG. 5, the voltage on lead 222 comprises the powering source for transmitter 61 in FIG. 3.

Figure 9:
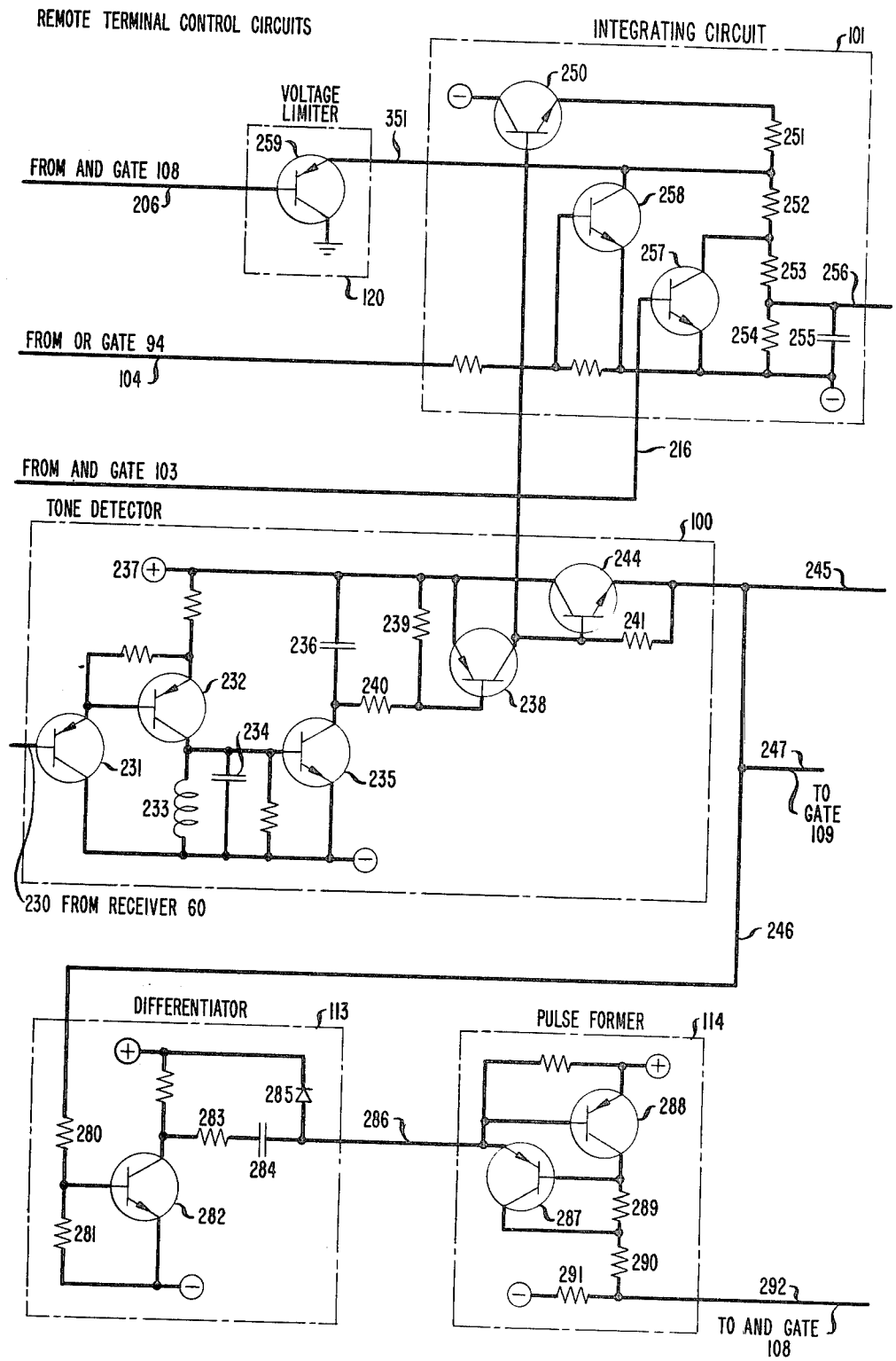

In FIG. 9 there is shown detailed circuit diagrams of yet other portions of remote terminal control circuits of FIG. 5. Thus, signals received from the central office by receiver 60 (FIG. 3) are detected and supplied on lead 230. These signals are applied to tone detector 100 which operates to detect the envelope of the received signal. To this end, the signals on lead 230 are applied to the base of transistor 231, the emitter of which is connected to the base of transistor 232. The collector circuit of transistor 232 includes an inductor 233 and a capacitor 234 tuned to the 2 kHz tone signal used for supervisory signals. In the presence of this supervisory tone, transistor 235 is enabled to provide a charging path for capacitor 236 from positive source 237. When the voltage on capacitor 236 builds up to a sufficient level, transistor 238 is enabled by way of the voltage divider comprising resistors 239 and 240. Resistors 239 and 240 and capacitor 236 filter out the 2 kHz signal so that transistor 238 is provided a constant activation during the time that the 2 kHz tone is on.

The collector of transistor 238 is connected to the base of transistor 244. When operated, transistor 238 activates transistor 244 which acts as a voltage supply gate. This serves as a voltage source to energize the loopback detector 107 by way of lead 245, as the input to the differentiator 113 by way of lead 246 and as one input to AND gate 109 by way of lead 247.

The collector of transistor 238 is also connected by way of lead 249 to the base of transistor 250 in integrating circuit 101. When thus energized, transistor 250 provides a voltage across the voltage divider comprising resistors 251, 252, 253 and 254. A capacitor 255 is connected across resistor 254 and is charged by the voltage appearing across this resistor. The signal on capacitor 255 serves as the input to loopback detector 107 and ringing detector 106 by way of lead 256 (see FIG. 5).

The charge on capacitor 255 can be removed and hence the signal removed from lead 256 by several alternate discharging paths. In the first instance, the termination of a tone signal from tone detector 100 on lead 249 disables transistor 250 and allows capacitor 255 to discharge through resistor 254. This discharge is sufficiently slow to maintain a reasonably constant voltage during the 20 Hz interruptions in the supervisory tone. However, it is rapid enough to allow capacitor 235 to discharge completely during the four-second silent interval of ringing.

A second discharge path for capacitor 255 is provided by way of transistor 257 through resistor 253.

Transistor 257 is enabled by a signal on lead 216 from AND gate 103 (FIG. 11), indicating that the subscriber being rung has gone off-hook. Resistor 253 is considerably smaller in value than resistor 254 and therefore permits a very rapid discharge of capacitor 255 to terminate ringing. Ringing can therefore be rapidly terminated when the called subscriber goes off-hook (ring trip).

Yet another discharge path for capacitor 255 is supplied by way of transistor 258 along with resistors 252 and 253. Transistor 258 is enabled by a signal on lead 104 from OR gate 94. This slower discharge path is implemented when the subscriber goes off-hook during the silent interval of ringing or during the low voltage intervals of the 20 Hz cycle. The delay thus implemented prevents premature termination of ringing due to ringing transients. However, after a suitable delay, ringing is terminated due to an off-hook condition.

The voltage limiter circuit 120 prevents a loopback test from being initiated once ringing has begun. It does so by clamping the voltage on lead 351 to a value low enough such that capacitor 255 cannot reach the loopback detector threshold. Transistor 259 clamps the voltage on lead 351 in response to a ringing indication on lead 206 from AND gate 108.

The detected tone envelope at the emitter of transistor 244 in tone detector 100 is also supplied by way of lead 246 to differentiator circuit 113. This signal, applied across resistors 280 and 281, operates transistor 282 which drives a differentiator comprising resistor 283 and capacitor 284. The positive spikes from this differentiator are clipped by diode 285 and the negative spikes supplied by way of lead 286 to pulse former 114. Pulse former 114 is a simple flip-flop comprising transistors 287 and 288 having their base and collector electrodes cross-connected. An output voltage, supplied across resistors 289, 290 and 291, provides an output signal on lead 292, connected to the midpoint of resistors 290 and 291, supplied to AND gatee 108 in FIG. 11.

Figure 10:
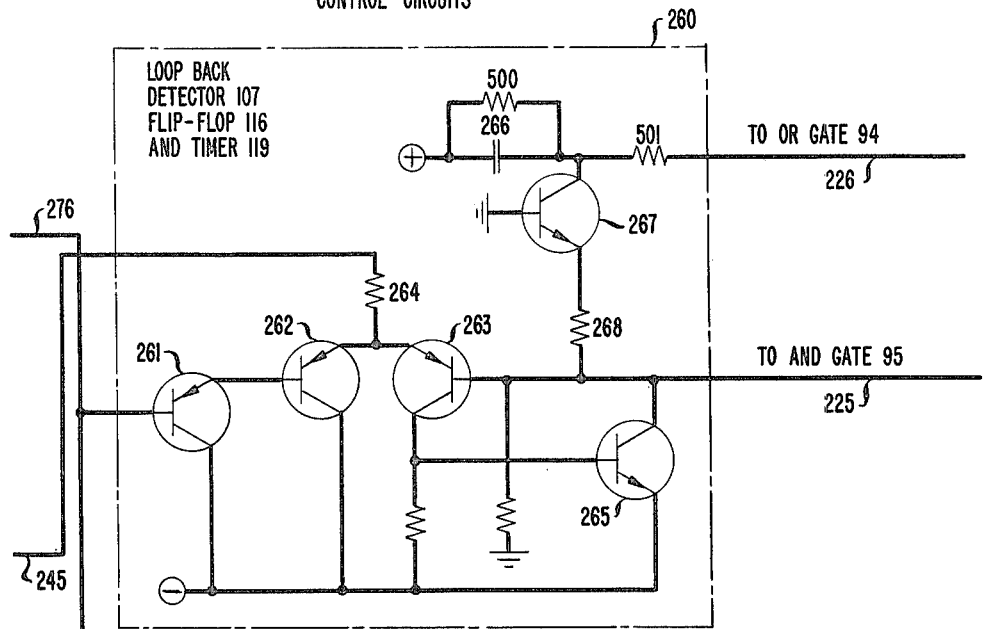
Figure 10:
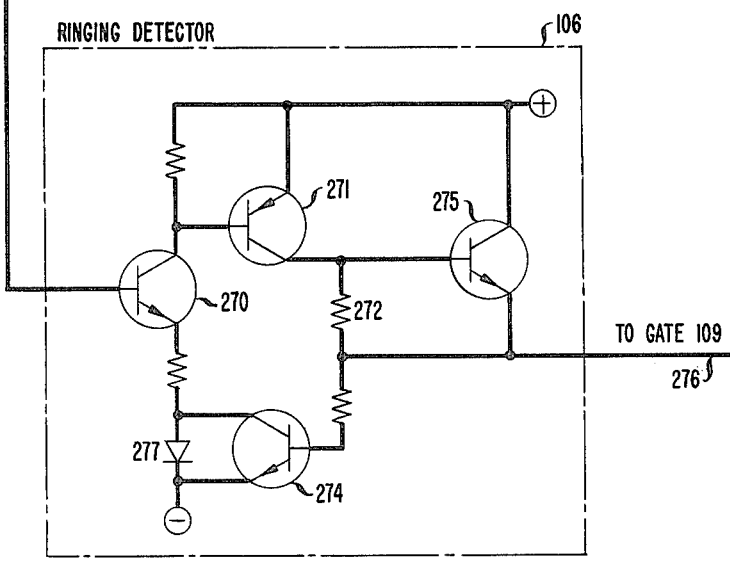

In FIG. 10, box 260 represents the loopback detector 107, flip-flop 116 and timer 119 of FIG. 5. Thus, the signal on lead 256 is applied to the base of transistor 261, the emitter of which is connected to the base of transistor 262. Transistors 262 and 263 form a long-tailed pair having their emitters connected together through a common emitter-resistor 264. The triggering level of this long-tailed pair is determined by the signal of the base of transistor 263, which in the idle state remains at ground potential. The emitter voltage for transistors 262 and 263 is supplied through resistor 264 and lead 245 through the collector-emitter path of transistor 244 to positive voltage source 237 in tone detector 100. Thus, the loopback detector is enabled only when the tone detector 100 detects the presence of the 2 kHz supervisory tone. Transistor 261 is active in the idle state and acts as an emitter follower with its emitter tracking the voltage on its base (lead 256). The transistor pair 262 and 263 acts as a comparator, comparing the voltage at the emitter of transistor 261 with ground potential. When the emitter voltage of transistor 261 rises above ground in response to a voltage rise on lead 256, the long-tailed pair is triggered and a loopback test condition has been detected.

The collector of transistor 263 is connected to the base of transistor 265, the collector of which is, in turn, connected to the base of transistor 263. Thus, transistors 263 and 265 comprise a flip-flop which is controlled by the signal at the base of transistor 261. When the comparator is triggered and the flip-flop is thus activated, transistor 265 is turned on and provides a charging path for capacitor 266 through isolating transistor 267 and resistor 268. The inverted output of the flip-flop, appearing on lead 225, is supplied to AND gate 95 in FIG. 8. Capacitor 266 and resistors 500 and 501 comprise the timing circuit 119 (FIG. 5), the output of which is supplied on lead 226. This signal is applied to OR gate 94 in FIG. 8 at the base of transistor 207.

The output of integrating circuit 101 on lead 256 is also supplied to ringing detector 106 at the base of transistor 270. When the voltage on lead 256 rises above the sum of the base-emitter voltage of transistor 270 plus the forward diode drop of diode 277, transistor 270 turns on and ringing is detected. Transistor 270 turning on in this manner initiates a positive feedback loop by activating transistor 271 which activates transistor 275 which, in turn, activates transistor 274. Transistor 274 shorts out diode 277, thereby reducing the threshold voltage required at input lead 256. Hence, the positive feedback introduces hysteresis in such a way that the voltage on lead 256 has to decay considerably before the ringing detector 106 is turned off. Once the ringing detector 106 has turned on, then, it has considerable immunity from being turned off by spurious ring trip detections or loop current detections. The output of ringing detector 106 on lead 276 is supplied to gate 109 in FIG. 11.

In FIG. 11 there is shown the balance of the remote terminal control circuits shown in block form in FIG. 5. The circuits of FIG. 11 comprise an inhibited AND gate 109 including a transistor 300, operated by signals from lead 247 across resistors 301 and 302. The signals on lead 247 are supplied from tone detector 100 and indicate the presence of the supervisory tone. The base electrode of transistor 304 is energized through resistor 303 and lead 276 from ringing detector 106. Thus, transistor 304 is enabled by the ringing detection signal over lead 276 unless transistor 300 has been enabled, which shorts the base-emitter junction of transistor 304 and prevents it from being on. Transistor 304 is thus gated at the 20 kHz rate as provided by the ringing envelope from the tone detector over lead 247.

Transistor 304 operates the low voltage ringing switch 112. Transistor 304, via lead 305, enables a voltage divider including resistors 306 and 307. Transistor 308, the base of which is connected to the midpoint of resistors 306 and 307, is thereby enabled and connects ring conductor 65 through transistor 308 to earth ground potential. As previously noted, switch 112 provides a return path for ringing current on the low voltage half-cycles of ringing.

AND gate 108 includes transistors 320 and 321 having their collector-emitter paths connected in series. When both transistor 320 and transistor 321 are enabled, current is allowed to flow through two voltage dividers including resistors 322-323 and resistors 324-325, respectively. Transistor 320 is operated by a signal on lead 292 from pulse former 114 in FIG. 9. Transistor 321 is operated by a signal lead 276 from ringing detector 106 supplied across resistors 326 and 327. The midpoint of resistors 322 and 323 is connected by way of lead 215 to AND gate 103 to enable the ring trip detector. The collector of transistor 320 is connected through resistor 328 and lead 206 to the base of transistor 259 in FIG. 9. The midpoint of resistors 324 and 325 is connected by way of lead 329 to high voltage ring switch 111.

High voltage ringing switch 111 comprises a transistor 330, the base of which is connected to lead 329.

When enabled, transistor 330 operates the Darlington pair, comprising transistors 331 and 332, to connect ring conductor 65 to a high voltage (e.g., 170 volt) negative ringing source 110. The ringing current in this path provides a voltage drop across resistor 333 which is used to control transistor 334 so as to provide a current limit for the current being supplied out of the ring supply 110. This current limit prevents large current transients during the switching action as well as limiting the current drawn when the customer goes off-hook during ringing.

Ring conductor 65 is connected to ring trip detector circuit 102 which monitors the voltage on lead 65. The output of detector 102 is transmitted to lead 216 only in the presence of a signal on lead 215 from AND gate 108 (thus performing the ANDing function of gate 103 in FIG. 5) and provides a ring trip signal on lead 216 only during the high voltage half-cycle if and when the subscriber goes off-hook in response to the ringing. Testing for the ring trip voltage drop only during the high voltage portion of the ringing cycle provides a substantially more sensitive detection of ring trip than is afforded with averaging circuits and, moreover, does so with very simple circuitry. Ring trip detector 102 comprises the subject matter of the copending patent application of the present applicant, Ser. No. 974,387, filed of even date herewith, and will not be discussed further here.

A subscriber loop carrier system has been described in which supervisory signals are impressed on carrier-derived channels by modulating the carrier frequency with a supervisory tone. Ringing is controlled by interrupting the supervisory signal at a ringing signal rate. Loopback continuity testing is accomplished by utilizing the same supervisory tone but without the 20 Hz ringing interruptions. Such continuity testing can be initiated by standard test procedures and, when successful, can respond with a standard continuity indication.

Although the ringing supervision and continuity testing arrangements of the present invention have been described in connection with a particular carrier system, it is to be understood that this carrier system was used for illustrative purposes only. The same principles can be readily applied to other types of carrier systems by modifications obvious to those skilled in the art and such modifications are deemed to be well within the spirit and scope of the present invention.

I claim:

1. A subscriber loop carrier system for deriving a plurality of telephone subscriber transmission channels on a single transmission facility, said system including a plurality of diverse carrier signal sources for differentiating said transmission channels,
   characterized by
   a supervisory signal source,
   means for selectively modulating signals from said supervisory signal source onto each one of said diverse carrier signals,
   means responsive to a first supervisory state for intermittently enabling said modulating means,
   means responsive to a second supervisory state for continuously enabling said modulating means, and
   means for detecting a received carrier signal in said transmission channels.

2. The subscriber loop carrier system according to claim 1
   characterized in that
   said first supervisory state comprises ringing, and
   means, at a remote location, responsive to said intermittently enabled modulating means, for generating telephone ringing signals at said intermittent rate.

3. The subscriber loop carrier system according to claim 1
   characterized in that
   said second supervisory state comprises loopback continuity testing, and
   means at a remote location, responsive to said continuously enabled modulating means, for returning a carrier signal on said corresponding transmission channel.

4. The subscriber loop carrier system according to claim 1 further
   characterized by
   a ringing signal detector at one end of said transmission facility to establish said first supervisory state.

5. The subscriber loop carrier system according to claim 1 further
   characterized by
   a continuity test voltage detector at one end of said transmission facility to establish said second supervisory state.

6. The subscriber loop carrier system according to claim 5 further
   characterized by
   means for providing a successful test voltage response signature at said one end of said transmission facility in response to said received carrier detecting means.

7. A loopback continuity testing system for a plurality of carrier-derived bilateral transmission channels on a single transmission facility
   characterized by
   continuity test voltage detecting means for modulating a supervisory tone onto the carrier for the corresponding one of said transmission channels,
   supervisory tone detecting means at the remote end of said transmission facility for returning a distinguishable signal on said corresponding transmission channel, and
   termination means response to said distinguishable signal for terminating said corresponding channel.

8. The loopback continuity testing system according to claim 7
   characterized in that
   said continuity test voltage detecting means comprises means for detecting a voltage larger in magnitude but opposite in polarity to the normal battery voltage on said transmission channel.

9. The loopback continuity testing system according to claim 7
   characterized in that
   said supervisory tone detecting means includes
   an envelope detector for said supervisory tone,
   timing means responsive to said supervisory tone for establishing a timed period, and
   gating means, responsive to said timing means, for enabling the transmission of said distinguishable signal for said timed period.

10. The loopback continuity testing system according to claim 7
    characterized in that
    said termination means comprises a resistor of a preselected value.

11. A method of testing the continuity of each of a plurality of bilateral transmission channels derived by frequency division carrier techniques on a signal transmission facility characterized by the steps of detecting a continuity testing voltage at one end of said facility for each said channel, modulating a supervisory tone on the outward bound carrier assigned to said channel, detecting said supervisory tone at the other end of said facility, enabling the transmission of the inward bound carrier signal assigned to said channel in response to the detection of said supervisory tone, detecting the reception of said inward bound carrier signal at said one end of said facility, and connecting a standard termination across said one end of said channel in response to detected inward bound carrier signals.

12. The method of continuity testing according to claim 11 further characterized in that said step of test voltage detection comprises the step of detecting a voltage larger in magnitude and of opposite polarity to the normal battery voltage appearing on said channel.

13. The method of continuity testing according to claim 11 further characterized in that said step of detecting said supervisory tone further comprises the steps of detecting the envelope of said outbound carrier signal, timing the duration of the response to said supervisory tone, and enabling the transmission of said inward bound carrier for the timed duration.

* * * * *